S. G. SILBERMAN.
NON-SKID CHAIN FOR VEHICLE TIRES.
APPLICATION FILED FEB. 5, 1918.
1,292,526. Patented Jan. 28, 1919.
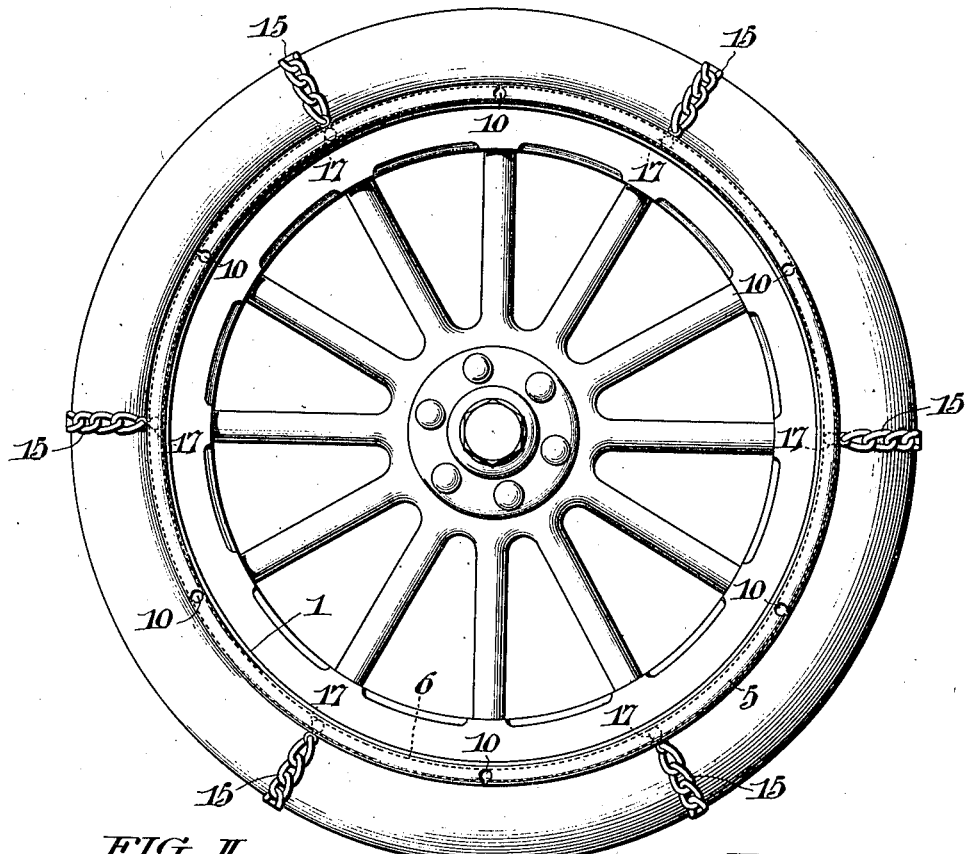
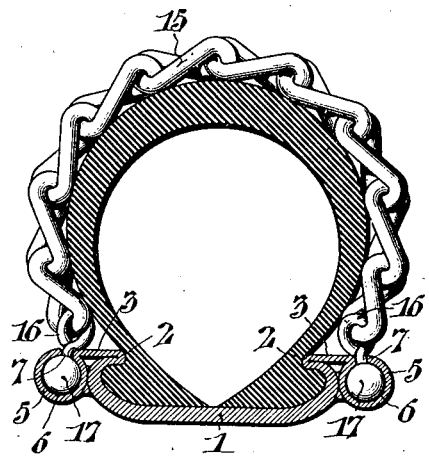
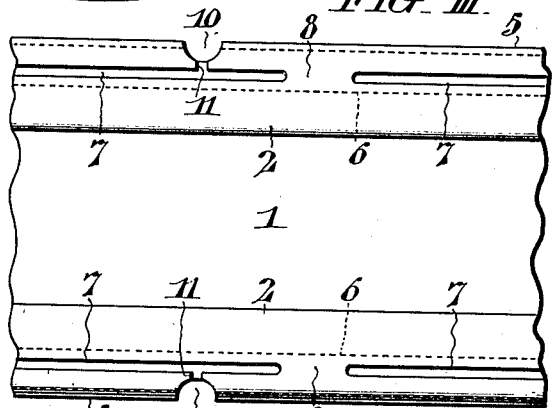
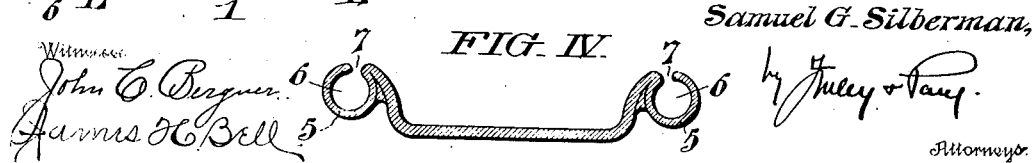
Inventor
Samuel G. Silberman,
Attorneys

UNITED STATES PATENT OFFICE.

SAMUEL G. SILBERMAN, OF PHILADELPHIA, PENNSYLVANIA, ASSIGNOR OF SEVEN ONE-HUNDREDTHS TO JESSIE H. McGREW, OF PHILADELPHIA, PENNSYLVANIA.

NON-SKID CHAIN FOR VEHICLE-TIRES.

1,292,526.  Specification of Letters Patent.  Patented Jan. 28, 1919.

Application filed February 5, 1918. Serial No. 215,459.

*To all whom it may concern:*

Be it known that I, SAMUEL G. SILBERMAN, of Philadelphia, in the county of Philadelphia and State of Pennsylvania, a citizen of the United States, have invented certain new and useful Improvements in Non-Skid Chains for Vehicle-Tires, of which the following is a specification, reference being had to the accompanying drawings.

My invention relates to a rubber or pneumatic vehicle tire, having attached to it chains for the prevention of skidding.

An object of the invention is to provide a rim construction for the attachment of a plurality of independent non-skid chains, which chains are each attached to the rim with a capacity for circumferential motion within defined limits, whereby each chain may gradually shift so as to press against the tread of the tire at different points and thus distribute the wear and lengthen the life of the tire.

In the accompanying drawings, Figure I, represents a wheel provided with a pneumatic tire as ordinarily used upon an automobile, and having applied to it a number of chains in such manner as to embody my invention.

Fig. II, is an enlarged sectional view of the same.

Fig. III, is an extension of a portion of the rim in a plane, and

Fig. IV, is a cross sectional view showing the application of my invention to a rim adapted for tires having straight sides.

Referring to the form illustrated in Figs. I to III, inclusive, the rim 1, of the automobile wheel is provided with retaining flanges 2, in the usual manner. The metal forming these flanges is prolonged or bent outwardly at 3, forming a lateral extension which terminates in an almost complete circular bend 5, forming a runway 6, with a slot 7. This slot is not continuous around the rim, but is interrupted at intervals by unslotted portions 8.

At least once for each slot and preferably in the region of one end thereof, there is provided a side opening 10, communicating with the slot 7, by the cross cut 11.

The chains 15, are of standard construction except that at each end is a link 16, carrying a ball 17. The size of this ball is such that it is capable of being inserted through the side opening 10, into the slot 7, where it is held in the runway 6, with capacity for traveling from one end of the slot to the other.

A chain constructed according to my invention when in use has the desirable capacity of shifting itself from one part of the rubber tread to another under the strains of use to the extent permitted by the length of the slots within which run the balls 17, linked to ends of the chain. Preferably the slots at one side of the wheel correspond in position to those at the other, so that full play is given to each chain to run from one end of its two slots to the other. The shifting takes place gradually, but with sufficient persistence to prevent the otherwise objectionable habit of such a chain overlying but a comparatively restricted portion of the tread, with the constant excessive wear upon that portion alone, whereas according to my invention this wear is distributed over a very much larger area of the surface of the tread with a consequent extension of the life of the tire.

In the modification of Fig. IV, I have shown a cross sectional view of a different style rim adapted for straight sided tires. While the application of my invention thereto requires a slightly different manner of bending the same to form the runways, the functional relations remain the same as described in the former instance. A further advantage attained by my invention is the great ease with which the chains are attached to the wheel or removed therefrom.

Having thus described my invention, I claim:

1. An anti-skid device including in combination, a wheel having a rim provided with runways at each side thereof, each runway having a plurality of separate slots arranged in line and located at the outer face and between the side faces of a runway, and non-skid chains having attached at their extremities enlargements of greater diameter than the width of the slots in the runway, said enlargements being adapted to engage the runways, whereby the non-skid chains are movably connected with the runways.

2. An anti-skid device including in combination, a wheel having a rim provided with runways at each side thereof, each runway being circular in cross section and substantially inclosed and having a plurality of separate slots arranged in line and located at the outer face and between the side faces of the runway, and non-skid chains having at their extremities enlargements of greater diameter than the width of the slots in the runway, said enlargements being adapted to engage the runways, whereby the non-skid chains are movably connected with the runways.

3. An anti-skid device including in combination a wheel having a rim provided with runways at each side thereof, each runway having a plurality of separate slots arranged in line and located at the outer face and between the side faces of the runway, and non-skid chains having attached at their extremities enlargements of greater diameter than the width of the slots in the runway, said enlargements being adapted to engage the runways, whereby the non-skid chains are movably connected with the runways, said runway having an opening at the side thereof between the extremities of each slot and leading into the slot, said openings being of sufficient size to permit the enlargements to be placed in the runways.

4. An anti-skid device including in combination, a wheel having a rim provided with runways at each side thereof, each runway being circular in cross section and substantially inclosed and having a plurality of separate slots arranged in line and located at the outer face and between the side faces of the runway, and non-skid chains having at their extremities enlargements of greater diameter than the width of the slots in the runway, said enlargements being adapted to engage the runways, whereby the non-skid chains are movably connected with the runways, said runway having an opening at the side thereof between the extremities of each slot and leading into the slot, said openings being of sufficient size to permit the enlargements to be placed in the runways.

In witness whereof, I have hereunto signed my name at Philadelphia, Pennsylvania, this second day of February, 1918.

SAMUEL G. SILBERMAN.

Witnesses:
   JAMES H. BELL,
   E. L. FULLERTON.